United States Patent
Fujimoto et al.

(10) Patent No.: US 6,671,423 B1
(45) Date of Patent: Dec. 30, 2003

(54) METHOD OF SUPPRESSING GEOMETRIC DISTORTION OF AN IMAGE SPACE

(75) Inventors: Ikumatsu Fujimoto, Tsukuba (JP); Kiyokazu Okamoto, Tsukuba (JP)

(73) Assignee: Mitutoyo Corporation, Kawasaki (JP)

( * ) Notice: Subject to any disclaimer, the term of this patent is extended or adjusted under 35 U.S.C. 154(b) by 611 days.

(21) Appl. No.: 09/695,850

(22) Filed: Oct. 26, 2000

(30) Foreign Application Priority Data

Oct. 27, 1999 (JP) .......................................... 11-306076

(51) Int. Cl.[7] .............................. G06K 9/32; G06K 9/40; G01B 11/00; G01C 17/38
(52) U.S. Cl. ........................ 382/294; 382/275; 356/388; 702/95
(58) Field of Search ................................ 382/276, 275, 382/294, 132, 141; 250/201.9; 356/511, 450, 512, 601, 388; 702/95, 94

(56) References Cited

U.S. PATENT DOCUMENTS 5,448,053 A * 9/1995 Rhoads ..................... 250/201.9
5,929,991 A * 7/1999 McArthur et al. .......... 356/520
6,130,959 A * 10/2000 Li ............................. 382/150

FOREIGN PATENT DOCUMENTS

JP 11211425 A * 8/1999 ........... G01B/11/16

OTHER PUBLICATIONS

"Bidimensional Regression," W.R. Tobler, Geographical Analysis, vol. 26, No. 3, Jul. 1994.*
"Automated Distortion Correction of X–ray Image Intensifier Images," Reimann D. A., et al., Conference Record on the 1992 IEEE Nuclear Science Symposium and Medical Image Conference, vol. 2, Oct. 25–31, 1992, pp. 1339–1341.*

* cited by examiner

Primary Examiner—Wenpeng Chen
(74) Attorney, Agent, or Firm—Oliff & Berridge, PLC

(57) ABSTRACT

A reference space includes a plurality of reference graphics. An image space is obtained by imaging the reference space. Affine transformation series are determined from the reference and image spaces for transcribing graphic cores of imaged graphics on graphic cores of reference graphics. If an affine-transformed positional error falls outside a tolerance, the reference space is divided into sub-spaces. Affine transformations and space divisions are repeated for out-of-tolerance sub-spaces until their estimations of distortion finally fall inside the tolerance.

7 Claims, 5 Drawing Sheets

SECONDARY DEVISION OF REFERENCE SPACE

SECONDARY DEVISION OF IMAGE SPACE

○ IN-TOLERANCE GRAPHIC CORE AFTER PRIMARY TRANSFORMATION
◎ IN-TOLERANCE GRAPHIC CORE AFTER SECONDARY TRANSFORMATION
● OUT-OF-TOLERANCE GRAPHIC CORE EVEN AFTER SECONDARY TRANSFORMATION

SECONDARY DEVISION
OF IMAGE SPACE

{ ○ IN-TOLERANCE GRAPHIC CORE AFTER PRIMARY TRANSFORMATION

⊘ IN-TOLERANCE GRAPHIC CORE AFTER SECONDARY TRANSFORMATION

● OUT-OF-TOLERANCE GRAPHIC CORE EVEN AFTER SECONDARY TRANSFORMATION

METHOD OF SUPPRESSING GEOMETRIC DISTORTION OF AN IMAGE SPACE

BACKGROUND OF THE INVENTION

1. Field of the Invention

The present invention relates to a method of suppressing geometric distortions contained in an image space, for example, when a plane shape is measured based on an image that is taken by an imaging device such as a CCD camera from a sample space to be measured.

2. Description of the Related Art

Conventional methods of compensating geometric distortions occurred in an image space imaged by a CCD camera, for example, through the use of grid-like graphics as a reference space, include:

(1) a method of approximating with divisional polynomials;

(2) a method of executing affine transformations over the entire space; and (3) a method of functionally approximating through the step of searching for reasons that cause distortions such as aberration on lens.

The method (1), which approximates using divisional polynomials, can be expected to achieve a high precision through the use of higher order polynomials, which on the other hand elevates a computational cost. The method (2), which executes affine transformations over the entire space, is not possible to respond non-linear distortions and thus can not be expected to achieve a high precision. The method (3), which functionally approximates, is difficult to derive a function and can not be expected to achieve a high precision for such a distortion that greatly varies a local curvature.

Accordingly, there is no practical method in the art that is possible to compensate distortions in an image space easily within any designated tolerance.

SUMMARY OF THE INVENTION

An object of the present invention is to provide a method capable of suppressing geometric distortions in an image space easily within a predetermined tolerance.

The present invention is provided with a method of suppressing geometric distortions in an image space obtained by imaging a sample space to be measured. The method comprises the steps of: preparing a reference space correspondingly located to a sample space to be measured, the reference space including a plurality of reference graphics and having previously known coordinate value positions of every graphic cores in the reference graphics and of a reference center defined as a graphic core of the whole reference graphics in the reference space; superimposing a transcription center in an image space on the reference center in the reference space, the image space being obtained by imaging the sample space to include a plurality of imaged graphics corresponding to the plurality of reference graphics, the transcription center being defined as a graphic core of the whole imaged graphics in the image space; executing a primary affine transformation to transform a group of transcription graphic cores consisting of graphic cores in the plurality of imaged graphics, core-by-core, on a group of reference graphic cores consisting of graphic cores in the plurality of reference graphics; performing a primary spatial division to divide the reference space into a plurality of primarily divided spaces; deriving an estimation of distortion for each of the primarily divided spaces from a positional error between each transcription graphic core after the primary affine transformation and the corresponding reference graphic core; classifying the primarily divided spaces into in- and out-of-tolerance divided spaces having estimation of distortion falling inside and outside a predetermined tolerance; executing a secondary affine transformation for the out-of-tolerance divided spaces to transform a group of transcription graphic cores in the corresponding image space on a group of reference graphic cores in the out-of-tolerance divided spaces; performing a secondary spatial division to divide the out-of-tolerance primarily divided spaces into a plurality of secondarily divided spaces after the primary and secondary affine transformations; and repeating affine transformations and spatial divisions for the out-of-tolerance divided spaces until the estimation of distortion fall inside the predetermined tolerance.

According to the present invention, repetitions of affine transformations and spatial divisions can easily eliminate geometric distortions in an image space obtained through imaging a sample space to be measured by means of a CCD camera or the like.

In the method of the present invention, the estimation of distortion may be determined as the maximum of a norm for a positional error between the reference graphic core and the transcription graphic core after the affine transformation. Alternatively, if the nearest transcription graphic core from the reference graphic core can be obtained, the estimation of distortion may be determined as the maximum of a norm for a positional error between the nearest transcription graphic core and the transcription graphic core corresponding to the reference graphic core. In each of the affine transformations, an affine transformer may be determined through the use of the least mean-square method for a positional error between a transformed position and the corresponding reference graphic core. Each of the spatial divisions may comprise a four-part division by dividing a space vertically and horizontally each in approximately two. The plurality of reference graphics may locate reference graphic cores thereof partly on a boundary of either the reference space or each of divided spaces obtained by dividing the reference space. A boundary of either the reference space or each of reference regions obtained by dividing the reference space may describe either one of a rectangle, triangle or circular arc.

Other features and advantages of the invention will be apparent from the following description of the preferred embodiments thereof.

BRIEF DESCRIPTION OF THE DRAWINGS

The present invention will be more fully understood from the following detailed description with reference to the accompanying drawings in which.

DETAILED DESCRIPTION OF THE PREFERRED EMBODIMENTS

Prior to specific embodiments, algorithms for eliminating geometric distortions in an image space according to the present invention will be described in the following order: (a) reference space and image space; (b) determination of affine transforming equation and estimation of distortion; and (c) spatial division for allowing all positional errors to fall within tolerance based on the estimation of distortion.

Figure 1:
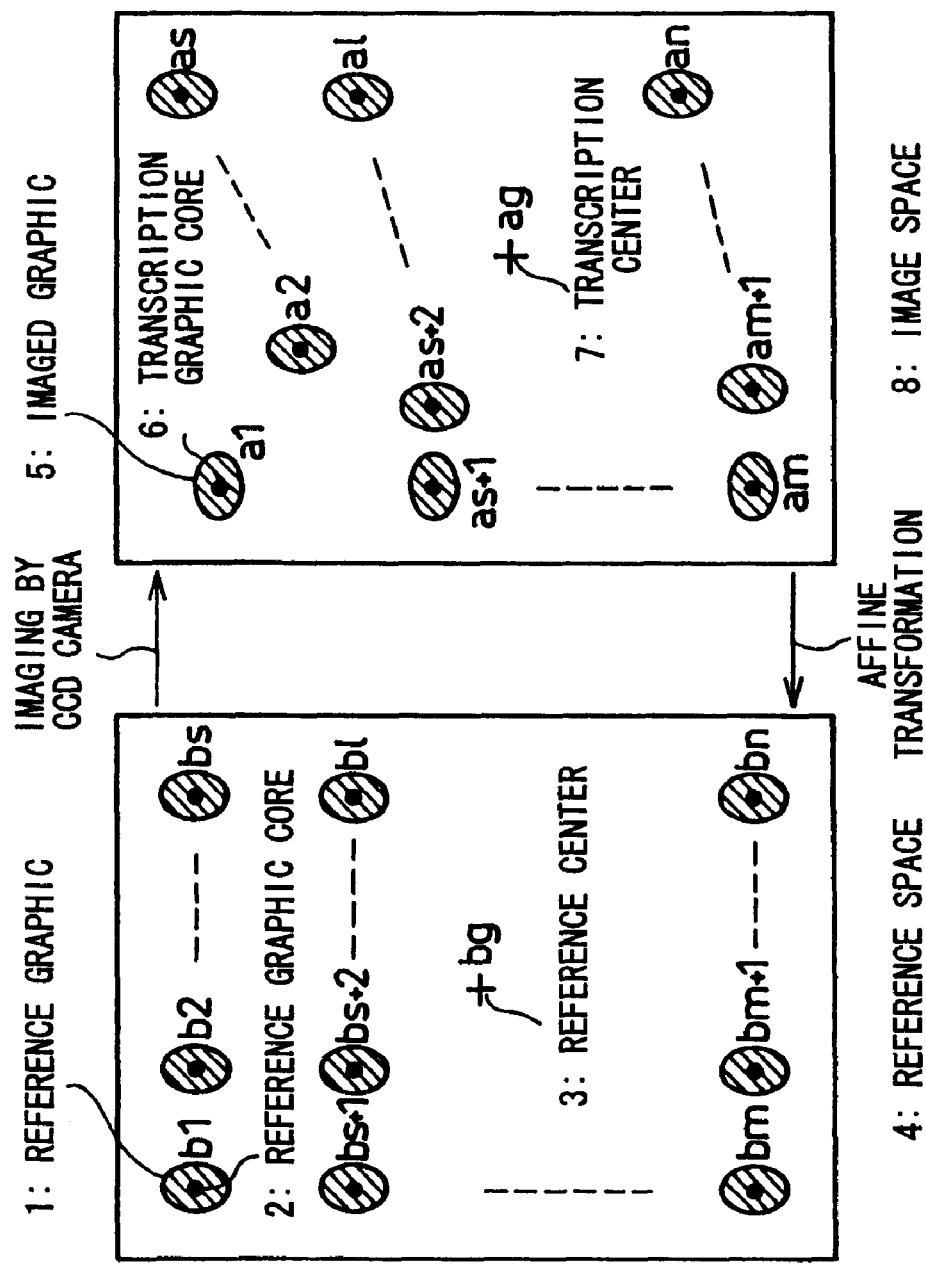
FIG. 1 shows a relation between a reference space and an image space in the present invention.

(a) Reference Space and Image Space:

As shown in FIG. 1, a reference space 4 is prepared to have a plurality of reference graphics 1 corresponding to a sample space to be measured. Each reference graphic 1 has a reference graphic core 2 ($b_k$ (k=1, 2, ..., n)), which is the graphic core with a previously known precise coordinate position. The grahic core in the whole reference graphics 1 is defined as the reference center 3 ($b_g$), which is also assumed to have a previously known coordinate value.

On the other hand, an image space 8 is obtained when a CCD images the reference graphics 1. For the image space 8, graphics corresponding to the reference graphics 1 are defined as imaged graphics 5; cores corresponding to the reference graphic cores 2 as transcription graphic cores 6 ($a_k$ (k=1, 2, ..., n)); and the graphic core in the whole imaged graphics 5, corresponding to the reference center 3, as the transcription center 7 ($a_g$). Each of the reference graphic 1 in the reference space 4 is determined to locate its reference graphic core 2 partly on a boundary of a divided space when a spatial division is performed as described later.

Figure 2:
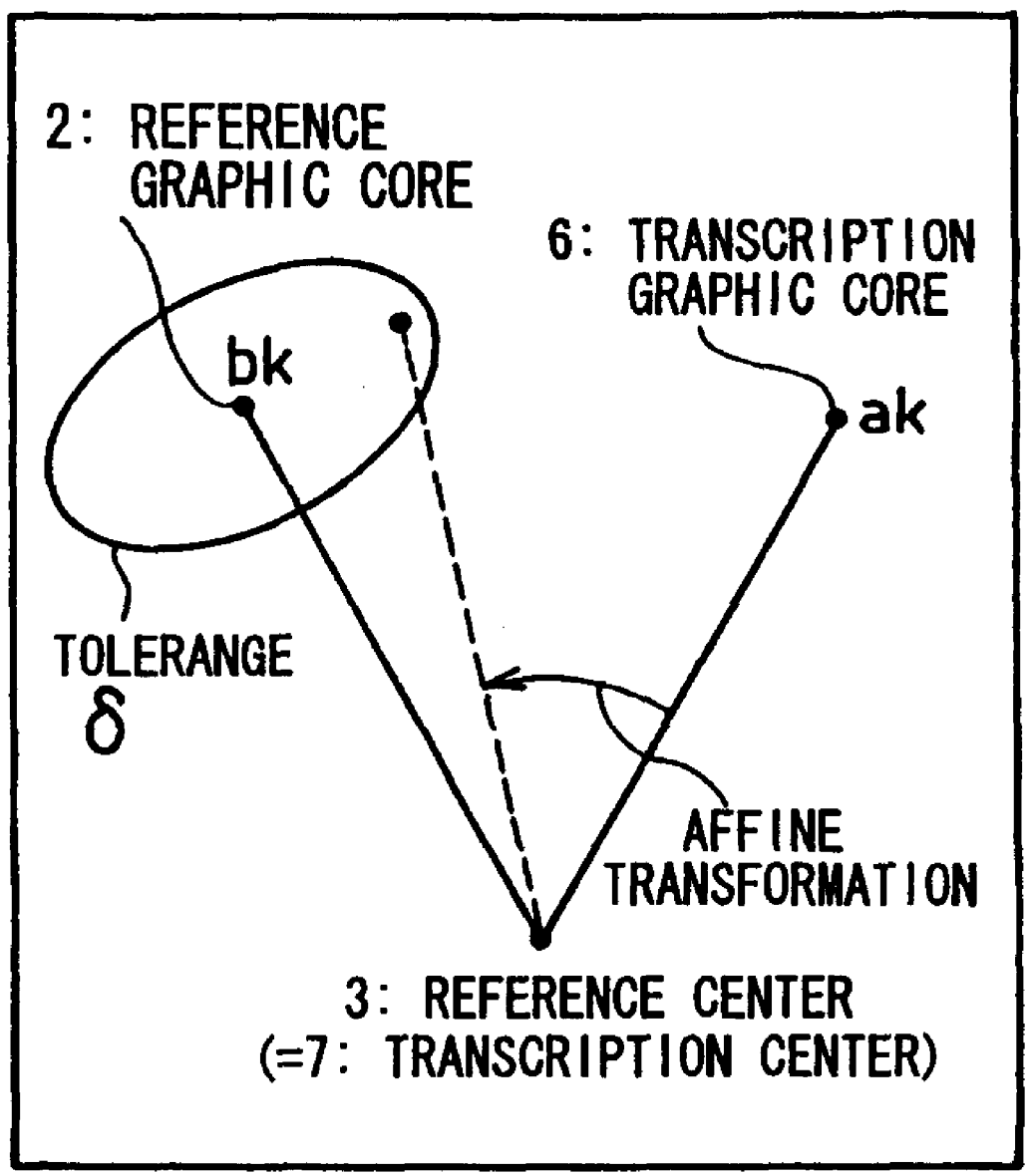
FIG. 2 shows a relation between an affine transformation and a tolerance in the present invention.

In such a relation between the reference space 4 and the image space 8, the reference center 3 ($b_g$) is superimposed on the transcription center 7 ($a_g$) as shown in FIG. 2. Then, an affine transformation is executed to transcribe the transcription graphic cores 6 on the reference graphic cores 2.

In this process, for all transcription graphic cores 6, the maximum of a positional error between an affine-transformed position and the corresponding reference graphic core 2 is employed as an estimation of distortion $\epsilon$ which is examined to determine whether it falls inside a predetermined tolerance $\delta$ or not. When the reference space 4 is divided into n two-dimensional grids, the following is assumed. The smallest space (a square region surrounded by four adjoining points) includes such previously selected groups of reference graphic cores 2 and of transcription graphic cores 6 that always fall inside a designated tolerance after an affine transformation is executed.

(b) Affine Transforming Equation and Estimation of Distortion $\epsilon$:

When reference graphic cores for n transcription graphic cores $a^k=(a^k_x, a^k_y)^T$ are defined as $b^k=(b^k_x, b^k_y)^T$, an affine transformer is represented by the following equation (1):

$$A = \begin{pmatrix} x_1 & x_2 \\ x_3 & x_4 \end{pmatrix} \quad (1)$$

where it is assumed that a coordinate value of each graphic core is converted into another coordinate value in such a coordinate system that has the origin consisting of the transcription original graphic core $a_g$ and the original graphic core $b_g$. In consideration of $b_k - A(A_0 a^k)$ for each k, a function $f(x_1, x_2, x_3, x_4)$ is expressed as:

$$f(x_1, x_2, x_3, x_4) = \sum_{K=1}^{n} \left\{ (b^k_x - (a^k_x x_1 + a^k_y x_2))^2 + (b^k_y - (a^k_x x_3 + a^k_y x_4))^2 \right\} \quad (2)$$

An affine transformer A is determined through the least mean-square method. That is, under the condition of $\partial f/\partial x_1 = \partial f/\partial x_2 = \partial f/\partial x_3 = \partial f/\partial x_4 = 0$, the affine transformer A can be derived by solving the following linear equation (3):

$$\begin{pmatrix} \sum_{k=1}^{n}(a^k_x)^2 & \sum_{k=1}^{n} a^k_x a^k_y & 0 & 0 \\ \sum_{k=1}^{n} a^k_x a^k_y & \sum_{k=1}^{n}(a^k_y)^2 & 0 & 0 \\ 0 & 0 & \sum_{k=1}^{n}(a^k_x)^2 & \sum_{k=1}^{n} a^k_x a^k_y \\ 0 & 0 & \sum_{k=1}^{n} a^k_x a^k_y & \sum_{k=1}^{n}(a^k_y)^2 \end{pmatrix} \begin{pmatrix} x_1 \\ x_2 \\ x_3 \\ x_4 \end{pmatrix} = \begin{pmatrix} \sum_{k=1}^{n} b^k_x a^k_x \\ \sum_{k=1}^{n} b^k_x a^k_y \\ \sum_{k=1}^{n} b^k_y a^k_x \\ \sum_{k=1}^{n} b^k_y a^k_y \end{pmatrix} \quad (3)$$

A solution of the equation (3) gives the following equation (4):

$$\begin{pmatrix} x_1 \\ x_2 \\ x_3 \\ x_4 \end{pmatrix} = \frac{1}{\sum_{k=1}^{n}(a^k_x)^2 \sum_{k=1}^{n}(a^k_y)^2 - \left(\sum_{k=1}^{n} a^k_x a^k_y\right)^2} \begin{pmatrix} \sum_{k=1}^{n}(a^k_y)^2 \sum_{k=1}^{n} b^k_x a^k_x - \sum_{k=1}^{n} a^k_x a^k_y \sum_{k=1}^{n} b^k_x a^k_y \\ -\sum_{k=1}^{n} a^k_x a^k_y \sum_{k=1}^{n} b^k_x a^k_x + \sum_{k=1}^{n}(a^k_x)^2 \sum_{k=1}^{n} b^k_x a^k_y \\ \sum_{k=1}^{n}(a^k_y)^2 \sum_{k=1}^{n} b^k_y a^k_x - \sum_{k=1}^{n} a^k_x a^k_y \sum_{k=1}^{n} b^k_y a^k_y \\ -\sum_{k=1}^{n} a^k_x a^k_y \sum_{k=1}^{n} b^k_y a^k_x + \sum_{k=1}^{n}(a^k_x)^2 \sum_{k=1}^{n} b^k_y a^k_y \end{pmatrix} \quad (4)$$

The affine transformer A in the image space can be represented by the following equation (5):

$$\begin{pmatrix} x \\ y \end{pmatrix} = A \begin{pmatrix} x \\ y \end{pmatrix} + b_g - A a_g \quad (5)$$

where (X, Y) denotes a coordinate value in the image space; and (x, y) a coordinate value in the reference space.

As mentioned above, the positional error between the reference graphic core 2 and the transformed transcription graphic core 6 is employed as the estimation of distortion $\epsilon$ For example, an estimation of distortion $\epsilon$ in the image space S is defined, as the maximum of a norm for a positional error between the reference graphic core and the affine-transformed transcription graphic core, by the following equation (6):

$$\varepsilon = \sup_{a \in S} \|Aa - b\| \qquad (6)$$

where a norm $\|\cdot\|$ is defined for any $$c = \begin{pmatrix} c_x \\ c_y \end{pmatrix} \in R^2$$

as the following equation (7):

$$\|c\| = \frac{1}{2}(|c_x + c_y| + |c_x - c_y|) \qquad (7)$$

In the equation (6), b denotes the reference graphic core in the reference space corresponding to the transcription graphic core $a \in S$.

In another example of the estimation of distortion $\varepsilon$, the following definition can be considered using b as the reference graphic core and a as the transcription graphic core in the same manner as above. Namely, in consideration of the nearest transcription position from the reference graphic core where x satisfies a, $x \in S$ and it can minimize $\|Ax-b\|$, as the maximum of a positional error between the nearest transcription position and the transcription graphic core corresponding to the reference graphic core, the estimation of distortion $\varepsilon$ can be defined as the following equation (8):

$$\varepsilon = \sup_{a \in S} \|\bar{x} - a\| \qquad (8)$$

where $\bar{x}$ is the nearest transcription position.

It is assumed that the estimation of distortion $\varepsilon$ represented by the equation (6) is employed in this discussion. This estimation of distortion $\varepsilon$ is subjected to a process for determining whether it falls inside the predetermined tolerance $\delta$ or not. If not, the image space (reference space) is subjected to a process for dividing it into divided image spaces, which are then subjected to next affine transformations. These processes are repeated until all estimations of distortion $\varepsilon$ finally fall inside the predetermined tolerance $\delta$ d to eliminate geometric distortions.

(c) Spatial Division for Allowing the Positional Error $\varepsilon$ to Fall Inside the Tolerance $\delta$:

As described above, giving $b^k=(b^k_x, b^k_y)^T$ to the reference graphic cores for n transcription graphic cores $a^k=(a^k_x, a^k_y)^T$; representing the affine transformer by the equation (1); and giving $b_g$ to the transcription graphic core in the reference space and $a_g$ to the original graphic core in the reference space, the following steps of spatial divisions are performed.

[FIRST STEP]

As shown in FIG. 1, from the reference graphic cores 2: $b^k=(b^k_x, b^k_y)$ in the entire space S of the reference space 4 and the corresponding transcription graphic cores 6: $a^k=(a^k_x, a^k_y)$, a primary affine transformer $A_0$ is derived through the method mentioned above.

[SECOND STEP]

Figure 3A:
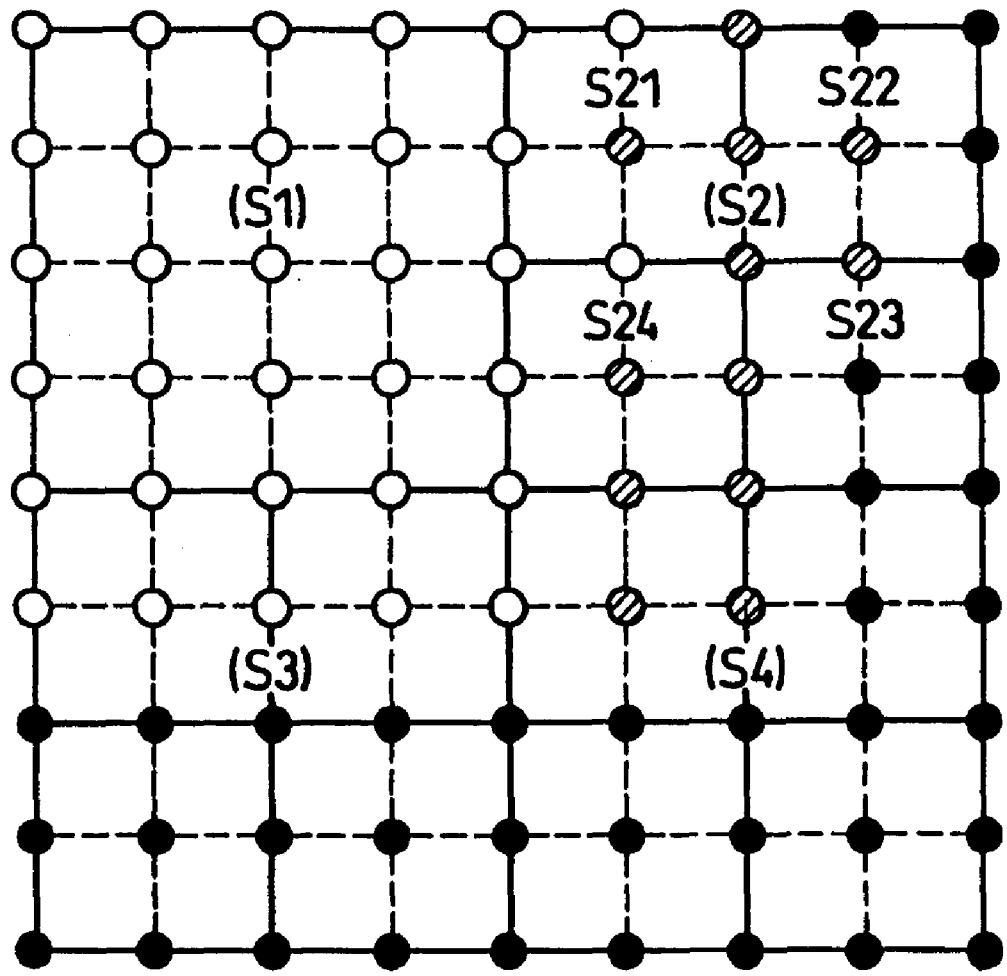
FIG. 3A illustrates an example of spatial division of the reference space in the present invention.
Figure 3B:
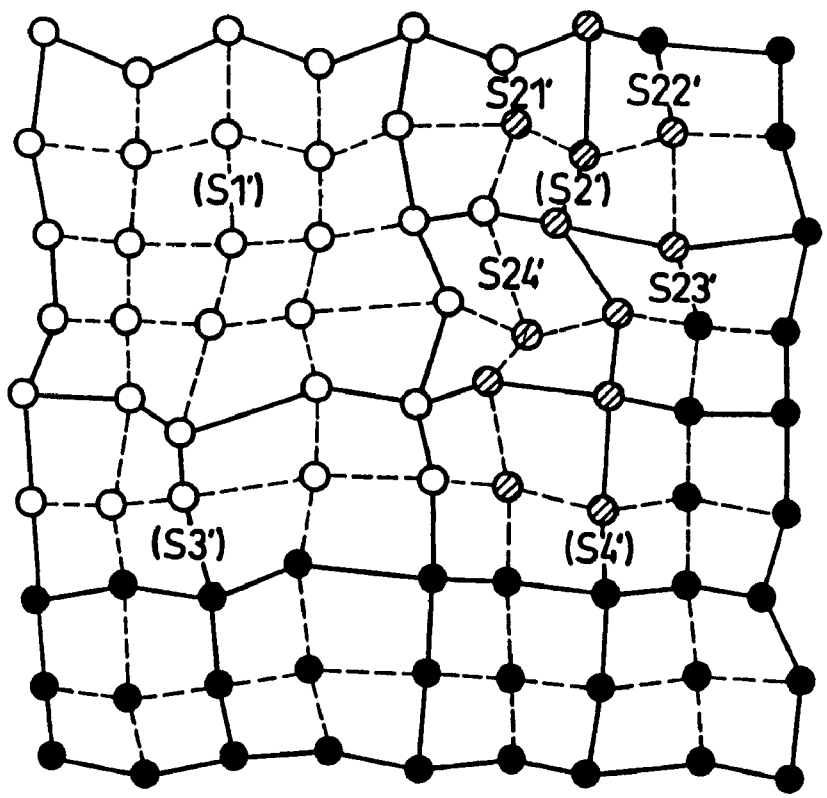
FIG. 3B illustrates an example of spatial division of the image space as well.

As shown in FIG. 3A, the primary spatial division performed to the reference space 4 yields divided spaces $S_1$, $S_2$, $S_3$ and $S_4$. In this example, the spatial division is a four-parts division, which divides the space vertically and horizontally each in approximately two in such a manner that divisional boundaries cross over the graphic core 2. Thus, a part of the reference graphic core 2 is present on a boundary of each divisional space (a reference region or the reference space). The boundary of each reference region describes a parallelogram (a square or rectangle) and the outermost frame constructs the reference space 4. It is also possible to set the reference space in such a manner that a boundary of the reference space or each reference region in the reference space describes a circular arc or triangle. The image space 8 is also divided into sub-spaces $S_1'$ to $S_4'$, as shown in FIG. 3B, which correspond to the primarily divided spaces $S_1$ to $S_4$ of the reference space 4. As the divided spaces in the reference space 4 correspond to those in the image space 8, one-by-one, the following description is specifically directed to the spatial division for the reference space.

An estimation of distortion for each of these divided spaces is shown with $\varepsilon_k$ (k=1, 2, 3, 4), which is equivalent to the maximum of a positional error between the transformed transcription graphic core and the corresponding reference graphic core. These divided spaces are primarily classified into in-tolerance divided spaces, which have an estimation of distortion that falls inside a predetermined tolerance $\delta$, and out-of-tolerance divided spaces, which have an estimation of distortion that falls outside the tolerance. In the example of FIG. 3, among the four divided spaces $S_1$–$S_4$, the divided space $S_1$ has such an estimation of distortion $\varepsilon$ that falls inside the tolerance 6 and thus it can be compensated with the primary affine transformer $A_0$. Namely, this divided space $S_1$ does not require to be further divided and can be compensated to fall its positional error inside the designated tolerance $\varepsilon$ with the following affine transforming equation (9):

$$\begin{pmatrix} x \\ y \end{pmatrix} = A_0 \begin{pmatrix} X \\ Y \end{pmatrix} + b_g - A_0 a_g \qquad (9)$$

As for the remaining divided spaces $S_2$, $S_3$, $S_4$, which have estimations of distortion that fall outside the tolerance $\delta$, the procedure is advanced to the next step.

[THIRD STEP]

These divided spaces $S_2$, $S_3$, $S_4$ have already been transformed with the primary affine transformer $A_0$. In this case, $A_0a$ is employed for the transcription graphic core in the transcription graphic, instead of a, in terms of determination of an affine transforming equation and estimation of a distortion. The divided space $S_2$ is exemplified in the following discussion.

For determination of an affine transformer, $b^k - A(A_0 a^k)$ is employed rather than $b^k - Aa^k$. An affine transformer A is determined through the least mean-square method expressing the function $f(x_1, x_2, x_3, x_4)$ by the following equation (10):

$$f(x_1, x_2, x_3, x_4) = \sum_{K=1}^{n} \{(b^k_x - (\tilde{a}^k_x x_1 + \tilde{a}^k_x x_2))^2 + (b^k_y - (\tilde{a}^k_x x_3 + \tilde{a}^k_x x_4))^2\} \qquad (10)$$

The estimation of distortion $\varepsilon$ can be derived from the following equation (11):

$$\varepsilon = \sup_{a \in S_2} \|A(A_0 a) - b\| \qquad (11)$$

When the affine transformer A thus derived is expressed by $A_1$, an affine transformer $A^{(2)}$ in the divided space $S_2$ is represented for any $$\begin{pmatrix} X \\ Y \end{pmatrix} \in S_1$$

by the following equation (12):

$$A^{(2)}\begin{pmatrix} X \\ Y \end{pmatrix} = A_1 \left( A_0 \begin{pmatrix} X \\ Y \end{pmatrix} \right) = (A_1 A_0)\begin{pmatrix} X \\ Y \end{pmatrix} \quad (12)$$

Therefore, it is concluded that $A^{(2)}=A_1A_0$. This affine transformer $A^{(2)}$ is a synthesis of two transformers: the primary affine transformer $A_0$ in the entire image space; and the secondary affine transformer $A_1$ in the primarily divided space $S_2$.

The divided space $S_2$ is further subjected to a secondary space division to form secondarily divided spaces $S_{21}$–$S_{24}$ as shown in FIGS. 3A–B. The spatial division in this case is also a four-part division by dividing the space vertically and horizontally each in approximately two so that the reference graphic cores 2 are arranged on divisional boundaries. These secondary divided spaces $S_{21}$–$S_{24}$ are secondarily classified into in-tolerance divided spaces $S_{21}$, $S_{24}$ and out-of-tolerance divided spaces $S_{22}$, $S_{23}$. They have estimations of distortion, $\epsilon_k$ (k=1, 2, 3, 4), after the primary and secondary synthesis transformations, that fall inside a designated tolerance $\delta$ and outside the tolerance, respectively. In the in-tolerance divided spaces $S_{21}$, $S_{24}$, their distortions can be compensated with the affine transformer $A^{(2)}$. For the out-of-tolerance divided spaces $S_{22}$, $S_{23}$, similar divisions are repeated.

Thus, in a divided space $S_{x1, x2, \ldots, xn}$ after the n-th order division, an affine transformer $A^{(n)}$ is represented in general for any $$\begin{pmatrix} X \\ Y \end{pmatrix} \in S_{x1, x2, \ldots, xn}$$

by the following equation (13):

$$A^{(n)}\begin{pmatrix} X \\ Y \end{pmatrix} = (A_{n-1, \ldots, 0})\begin{pmatrix} X \\ Y \end{pmatrix} \quad (13)$$

This affine transformer Al(can effect to eliminate distortions.

Via the above first through third steps, it is possible at all points in the image space to allow positional errors to fall inside the designated tolerance $\delta$.

Figure 4:
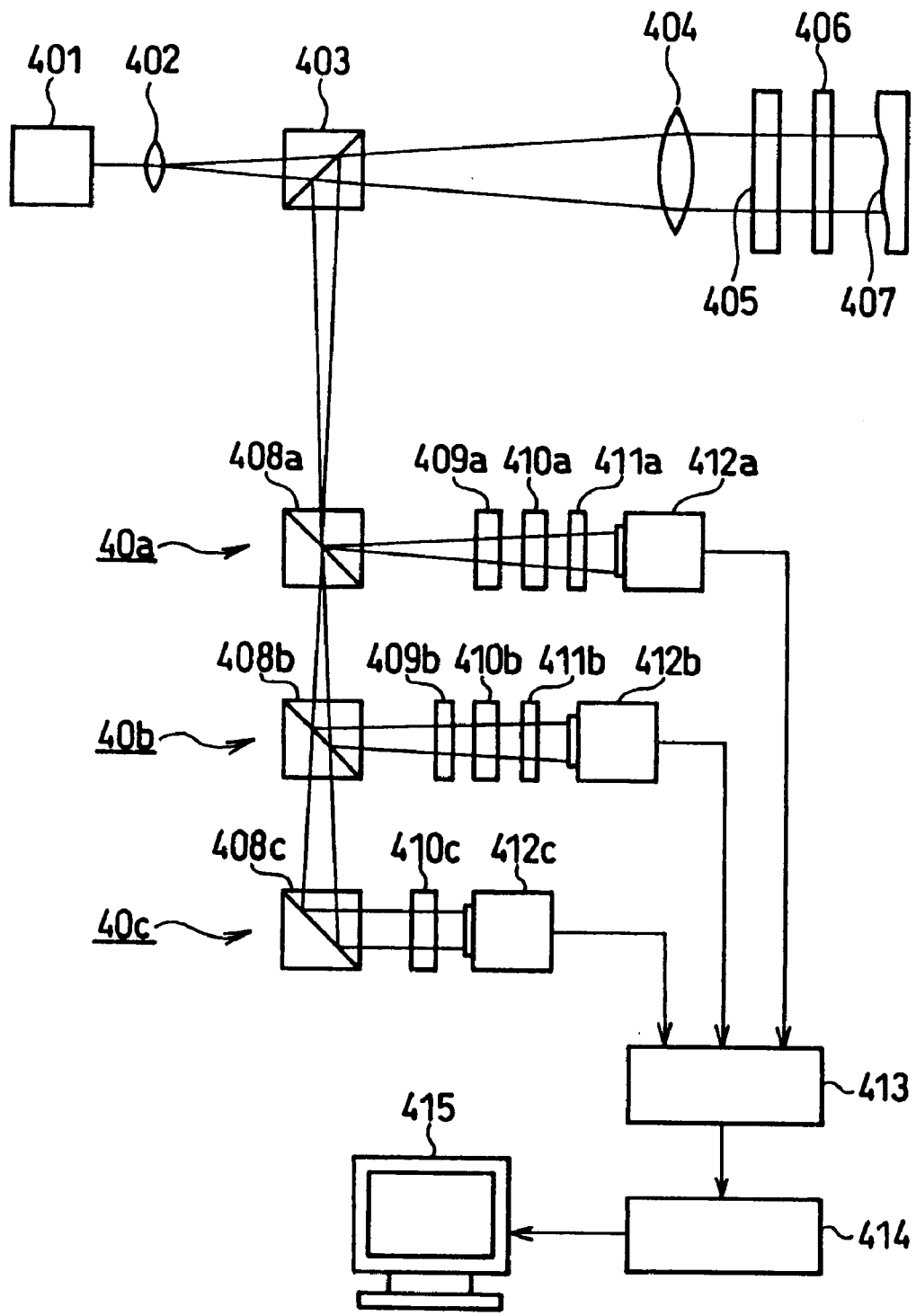
FIG. 4 shows a system for imaging an interference fringe image, to which the present invention is applicable.

A specific embodiment of an application of the above algorithms to a system for measuring a plane shape will now be described. FIG. 4 illustrates an apparatus for measuring interference fringes of phase-shift type with plural (three, in this case) CCD cameras 412a, 412b and 412c to take interference fringe images for measurement of a plane shape. JP 2-287101A publication proposes the principle of such the apparatus for measuring phase-shifted interference fringes simultaneously. A laser light source 401 emits a coherent light beam, which is enlarged through a lens 402, then collimated at a collimator lens 404 via a non-polarizing beam splitter 403, and applied to a reference surface 405. The reference surface 405 is partly reflective and partly transmissible. A beam transmitted through the reference surface 405 is applied to a sample surface 407 via a ¼-wavelength plate 406.

A light reflected at the reference surface 405 and a light reflected at the sample surface 407 are superimposed one another at the ¼-wavelength plate 406 as non-interfered beams that have orthogonal polarization directions (that is, a 180-degree phase difference). Then, they are further reflected at the beam splitter 403. The non-interfered beams are circular polarized beams that have plane shape information of the sample surface 407 in the form of a phase difference between the light reflected at the reference surface 405 (a reference light) and the light reflected at the sample surface 407 (a sample light). These non-interfered beams are split by two non-polarizing beam splitters 408a, 408b and a full-reflective mirror 408c successively in two and then introduced into three spectroscopic systems 40a, 40b and 40c.

The spectroscopic systems 40a and 40b include a ¼-wavelength plate 409a and a ½-wavelength plate 409b, for example, to provide the three non-interfered beams with phase differences of each 90-degree. The spectroscopic systems 40a, 40b and 40c respectively include polarizing plates 410a, 410b and 410c for converting phase difference information of each spectral beam into interference fringe intensity information. These polarizing plates 410a, 410b and 410c have such polarizing directions that are oblique to each other by 45-degree. Consequently, CCD cameras 412a, 412b and 412c in the spectroscopic systems 40a, 40b and 40c can take three interfered images between the reference light and the sample light, each phase-shifted by 90-degree. Attenuation plates 411a and 411b are interposed for the purpose of keeping intensities of light received at the spectroscopic systems 40a, 40b and 40c equally.

The three interfered images having different phases and taken by the CCD cameras 412a, 412b and 412c are sent to an image processor 413 and controlled by a control computer 414 and monitor 415 to compute shape information of the sample surface 407 through a certain arithmetic.

Specifically, each interference fringe information $I_l(x, y)$ can be obtained in this embodiment in relation to respective positions (x, y) in the image spaces from the three CCD cameras 412a, 412b and 412c. These CCD cameras 412a, 412b, 412c and optical elements preceding them, however, cause geometric distortions in the image space. Accordingly, the interference fringe information $I_l(x, y)$ in relation to each position (x, y) is not always equal to interference information at the same position. Thus, a certain compensation is required to eliminate or suppress the geometric distortions so that the interference fringe information $I_l(x, y)$ in relation to each position (x, y) in the image space is always equal to the interference information at the same position.

The algorithms (a)–(c) mentioned above are applied for this purpose. Giving $S^1_k$ (k=1, ..., $n_1$) to each divided space in three image spaces l=1, 2, 3 obtained, an affine transforming equation in each divided space is represented by the following equation (14):

$$\begin{pmatrix} X \\ Y \end{pmatrix} = A_k^l \begin{pmatrix} X^1 \\ Y^1 \end{pmatrix} + b_g^{1k} - A_k^l a_g^{1k} \quad (14)$$

where $b^1{}_g{}^k$ and $a^1{}_g{}^k$ denote the original graphic core and the transcription original graphic core at $S^1_k$(k=1, ..., $n_1$), respectively.

Next, each coordinate value $(X^1, Y^1)$ in the three image spaces 1 corresponding to respective coordinate values (x, y) in the reference space is represented by the following equation (15):

$$\begin{pmatrix} X^1 \\ Y^1 \end{pmatrix} = A_k^{1-1}\begin{pmatrix} x \\ y \end{pmatrix} - b_g^{1k} + A_k^1 a_g^{1k} \quad (X^1, Y^1) \in S_k^1 \qquad (15)$$

Accordingly, the interference information in relation to the three image spaces 1 corresponding to each position (x, y) on the sample surface 407 can be given from the interference fringe information $I_1(X^1, Y^1)$ at the coordinate value $(X^1, Y^1)$ previously obtained.

Thus, interference fringe information (light intensity values) corresponding to the same positions as those on the sample surface can be obtained from three imaging devices without the geometric distortions in the CCD image.

As obvious from the forgoing, the method according to the present invention can easily eliminate geometric distortions between a sample space to be measured and a CCD-imaged space within a predetermined tolerance. Therefore, it can be expected to perform measurements of a plane shape, a coordinate position and the like with high precision through the use of a plurality of optical systems and the corresponding CCD cameras.

In addition, the present method can be performed with less time and computational cost so long as the optical and imaging systems are kept unchanged. This is because that, if a final affine transformer is prepared to effect on each region, it can be employed, every time when image information is obtained, to effect on each region at the initial stage of processing the image information.

Having described the embodiments consistent with the present invention, other embodiments and variations consistent with the invention will be apparent to those skilled in the art. Therefore, the invention should not be viewed as limited to the disclosed embodiments but rather should be viewed as limited only by the spirit and scope of the appended claims.

What is claimed is:

1. A method of suppressing geometric distortions in an image space obtained by imaging a sample space to be measured, comprising the steps of:

preparing a reference space correspondingly located to a sample space to be measured, said reference space including a plurality of reference graphics and having previously known coordinate value positions of every graphic cores in said reference graphics and of a reference center defined as a graphic core of the whole reference graphics in said reference space;

superimposing a transcription center in an image space on the reference center in said reference space, said image space being obtained by imaging said sample space to include a plurality of imaged graphics corresponding to said plurality of reference graphics, the transcription center being defined as a graphic core of the whole imaged graphics in said image space;

executing a primary affine transformation to transform a group of transcription graphic cores consisting of graphic cores in said plurality of imaged graphics, core-by-core, on a group of reference graphic cores consisting of graphic cores in said plurality of reference graphics;

performing a primary spatial division to divide said reference space into a plurality of primarily divided spaces;

deriving an estimation of distortion for each of said primarily divided spaces from a positional error between each transcription graphic core after said primary affine transformation and the corresponding reference graphic core;

classifying said primarily divided spaces into in- and out-of-tolerance divided spaces having estimations of distortion falling inside and outside a predetermined tolerance;

executing a secondary affine transformation for said out-of-tolerance divided spaces to transform a group of transcription graphic cores in the corresponding image space on a group of reference graphic cores in said out-of-tolerance divided spaces;

performing a secondary spatial division to divide said out-of-tolerance primarily divided spaces into a plurality of secondarily divided spaces after said primary and secondary affine transformations; and repeating affine transformations and spatial divisions for said out-of-tolerance divided spaces until said estimations of distortion fall inside said predetermined tolerance.

2. The method according to claim 1, wherein said estimation of distortion is determined as the maximum of a norm for a positional error between said reference graphic core and said transcription graphic core after said affine transformation.

3. The method according to claim 1, further obtaining the nearest transcription graphic core from said reference graphic core, wherein said estimation of distortion is determined as the maximum of a norm for a positional error between said nearest transcription graphic core and the transcription graphic core corresponding to said reference graphic core.

4. The method according to claim 1, wherein an affine transformer is determined in each of said affine transformations through the use of the least mean-square method for a positional error between a transformed position and the corresponding reference graphic core.

5. The method according to claim 1, wherein each of said spatial divisions comprises a four-part division by dividing a space vertically and horizontally each in approximately two.

6. The method according to claim 1, wherein said plurality of reference graphics locate reference graphic cores thereof partly on a boundary of either said reference space or each of divided spaces obtained by dividing said reference space.

7. The method according to claim 1, wherein a boundary of either said reference space or each of reference regions obtained by dividing said reference space describes either one of a rectangle, triangle or circular arc.

* * * * *